United States Patent
Daniels et al.

(10) Patent No.: US 10,654,137 B2
(45) Date of Patent: May 19, 2020

(54) REPAIR OF WORN COMPONENT SURFACES

(71) Applicant: MTU Aero Engines AG, Munich (DE)

(72) Inventors: Bernd Daniels, Groebenzell (DE); Michael Hillen, Olching (DE); André Werner, Lichtenstein/Sa. (DE)

(73) Assignee: MTU AERO ENGINES AG, Munich (DE)

( * ) Notice: Subject to any disclaimer, the term of this patent is extended or adjusted under 35 U.S.C. 154(b) by 591 days.

(21) Appl. No.: 15/286,898

(22) Filed: Oct. 6, 2016

(65) Prior Publication Data

US 2017/0100805 A1 Apr. 13, 2017

(30) Foreign Application Priority Data

Oct. 8, 2015 (DE) .......................... 10 2015 219 512

(51) Int. Cl.

| | |
|---|---|
| *B23P 6/04* | (2006.01) |
| *B23K 35/02* | (2006.01) |
| *B23K 1/00* | (2006.01) |
| *F01D 5/00* | (2006.01) |
| *B23P 6/00* | (2006.01) |

(Continued)

(52) U.S. Cl.
CPC ............ *B23P 6/045* (2013.01); *B23K 1/0008* (2013.01); *B23K 1/0018* (2013.01); *B23K 1/20* (2013.01); *B23K 35/0233* (2013.01); *B23K 35/3033* (2013.01); *B23P 6/007* (2013.01); *B32B 15/01* (2013.01); *C22F 1/10* (2013.01); *C25D 3/12* (2013.01); *C25D 5/40* (2013.01); *F01D 5/005* (2013.01); *F01D 11/12* (2013.01); *F01D 25/24* (2013.01); *B23K 2101/001* (2018.08); *F05D 2220/323* (2013.01); *F05D 2230/80* (2013.01);

(Continued)

(58) Field of Classification Search
CPC ... F01D 5/005; F05D 2230/80; B23K 1/0018; B23K 35/3033; B23P 6/045; B23P 6/007; C09D 5/40
See application file for complete search history.

(56) References Cited

U.S. PATENT DOCUMENTS

| | | | |
|---|---|---|---|
| 5,077,140 A | 12/1991 | Luthra et al. | |
| 6,670,049 B1 * | 12/2003 | Schaeffer | B22F 7/04 428/552 |

(Continued)

FOREIGN PATENT DOCUMENTS

| | | |
|---|---|---|
| DE | 4112218 A1 | 10/1991 |
| DE | 102009036405 A1 | 2/2011 |

(Continued)

*Primary Examiner* — Veronica F Faison
(74) *Attorney, Agent, or Firm* — Abel Schillinger, LLP

(57) ABSTRACT

The present invention relates to a component of a turbomachine with a repair layer and a method for repairing wear-damaged components (1, 10) of a turbomachine, in particular of elements of a flow duct boundary, having the following method steps:
preparing the area to be repaired, in order to provide a smooth and clean surface (4),
applying an Ni-based braze (7) with a proportion of hard material particles (8) to the surface (4) to form a repair layer (15), wherein the hard material particles comprise hard alloys based on cobalt or nickel,
heat treating the component to braze the repair layer onto the component under vacuum conditions.

20 Claims, 1 Drawing Sheet

(51) Int. Cl.
    *F01D 11/12*     (2006.01)
    *B23K 1/20*     (2006.01)
    *B23K 35/30*     (2006.01)
    *B32B 15/01*     (2006.01)
    *C22F 1/10*     (2006.01)
    *C25D 3/12*     (2006.01)
    *C25D 5/40*     (2006.01)
    *F01D 25/24*     (2006.01)
    *B23K 101/00*     (2006.01)

(52) U.S. Cl.
    CPC .. *F05D 2300/177* (2013.01); *F05D 2300/701* (2013.01)

(56) References Cited

U.S. PATENT DOCUMENTS

| | | |
|---|---|---|
| 6,811,898 B2 | 11/2004 | Ohara |
| 7,222,422 B2 | 5/2007 | Gupta et al. |
| 7,789,288 B1 * | 9/2010 | Johnson ............... B23K 1/0018 228/119 |
| 8,544,716 B2 | 10/2013 | Daniels et al. |
| 2001/0006187 A1 * | 7/2001 | Hasz ................... B23K 1/0018 228/119 |
| 2003/0183529 A1 * | 10/2003 | Ohara ...................... C23C 6/00 205/109 |
| 2005/0181231 A1 * | 8/2005 | Gupta ................. B23K 1/0008 428/668 |
| 2006/0134454 A1 * | 6/2006 | Sathian ................ B22F 1/0003 428/668 |
| 2008/0017694 A1 * | 1/2008 | Schnell ................ B23K 35/304 228/119 |
| 2012/0125979 A1 * | 5/2012 | Daniels ............. B23K 35/0244 228/119 |
| 2012/0288639 A1 | 11/2012 | Hanrieder |
| 2014/0342169 A1 | 11/2014 | Daniels et al. |
| 2015/0118060 A1 * | 4/2015 | Kumar .................... F01D 5/005 416/241 R |

FOREIGN PATENT DOCUMENTS

| | | |
|---|---|---|
| DE | 102011087158 A1 | 5/2013 |
| EP | 1563937 A2 | 8/2005 |
| EP | 2275220 A1 | 1/2011 |
| EP | 2522452 A1 | 11/2012 |

* cited by examiner

REPAIR OF WORN COMPONENT SURFACES

CROSS-REFERENCE TO RELATED APPLICATIONS

The present application claims priority under 35 U.S.C. § 119 of German Patent Application No. 102015219512.0, filed Oct. 8, 2015, the entire disclosure of which is expressly incorporated by reference herein.

BACKGROUND OF THE INVENTION

1. Field of the Invention

The present invention relates to a method for repairing wear-damaged components of a turbomachine and appropriately repaired components of a turbomachine with a repair layer.

2. Discussion of Background Information

In turbomachines, such as stationary gas turbines or aircraft engines, combustion air is drawn in and compressed and combusted in a combustion chamber with combustion fuel, rotors being driven by the combustion gases as they flow out. Due to the high thermal, mechanical and corrosive loads during operation, components of a turbomachine, such as for example boundary elements for a flow channel for the combustion gas, are under certain circumstances subject to changes that are so great that they no longer meet requirements after a given operating time and have to be replaced or repaired. Such boundary elements of flow channels may for example be subject, in overlap regions where they are joined to adjacent boundary elements, to elevated wear as a result of mutual movement, which leads to deviation of the components from the necessary component geometry, such that it may become necessary to replace or repair these components.

It is already known from EP 1 563 937 A2, the entire disclosure of which is incorporated by reference herein, to repair components of turbomachines or turbomachines which are subject to elevated wear by brazing on repair material. However, the cobalt-based braze material used in EP 1 563 937 A2 has a high brazing temperature, such that application of the repair material is made more difficult. In addition, the repair layers known in the prior art have not proven very durable.

It would therefore be advantageous to provide a repair method and a repair layer or a corresponding component with a repair layer which enable efficient application of the repair layer, wherein the repair layer should have as long a service life as possible.

SUMMARY OF THE INVENTION

The present invention provides a method and a component as set forth in the independent claims. Advantageous refinements thereof are set forth in the dependent claims.

The present invention proposes providing as repair layer a nickel-based braze material with incorporated hard material particles, wherein the hard material particles are formed by a hard alloy based on cobalt or nickel. Such repair layers may be applied in a simple manner in that first of all a smooth and clean surface is provided for application of the repair layer, after which the nickel-based braze material with the hard material particles is applied to the corresponding surface and then the repair layer is brazed onto the component by heat treatment of the component with the applied nickel-based braze material and the hard material particles under vacuum conditions. As a result of the hard material particles incorporated in the nickel-based braze material, a long service life may be achieved for the repair layer.

The invention therefore proposes providing a wear protection coating similar to that disclosed in U.S. Pat. No. 6,811,898 B2, the entire disclosure of which is incorporated by reference herein, as repair layer, the repair layer being modified for the intended purpose and in particular using hard material particles which are conformed to the intended purpose, and enabling a homogeneous profile of properties of the component also in the peripheral region in which the repair layer replaces an original component region.

In the method for repairing wear-damaged components of a turbomachine, to prepare the area to be repaired, i.e. to prepare the area on which the repair layer is to be arranged, material may be removed therefrom, in particular by machining, such as grinding or milling, in order to form a clean and defined surface to which the repair layer may be applied.

Prior to application of the repair layer in the form of a nickel-based braze material with incorporated hard material particles, the surface to which the repair layer is to be applied may be blasted with silicon carbide particles and/or nickel particles to improve adhesion of the nickel-based braze material. Alternatively or in addition, a nickel layer may be deposited by electroplating.

The base material on which the repair layer is intended to be applied may be formed by Ni- or Co-based alloys, in which Ni or Co therefore form the main alloy constituent. In particular, the alloys may be superalloys of these main alloy constituents, which may reach service temperatures of over 50%, in particular over 80 or 90% of their melting temperature and be for example monocrystalline in form.

The nickel-based braze material may be applied in the form of a tape or a foil, wherein the braze tape (braze paste) used or a corresponding braze foil may be of flexible construction, in order to ensure that the braze rests completely against the surface of the component to be repaired.

The braze tape or the braze foil may be of multilayer and in particular two-layer construction, wherein in an outer layer the proportion of incorporated hard material particles may be greater than in an inner layer lying against the component to be repaired. It is in particular possible in an inner layer, which is intended to be arranged on the component to be repaired, to dispense wholly with the incorporation of hard material particles, such that there the nickel-based braze material is substantially present. In this way too it is possible to ensure that the repair layer does not modify to an excessive degree the profile of properties of the component to be prepared, in particular in the peripheral region.

The outer layer of a corresponding braze tape or a braze foil may comprise 50 to 30 wt. %, preferably 45 to 35 wt. % and in particular around 40 wt. % of hard material particles.

The nickel-based braze material consists substantially of nickel, which constitutes the main component. In addition, further chemical elements, such as chromium, silicon and/or boron, may be added by alloying.

The braze tape or the braze foil may be applied to the area to be repaired using bonding agents or a braze paste. To this end, a braze paste may be used which has the same braze as the braze tape or the braze foil. In particular, a braze tape or a braze foil may be surrounded with a corresponding braze paste, such that braze paste is arranged at the edges of the braze tape or the braze foil in order to enable a smooth transition between the repair layer and the surrounding component.

To prevent braze from being able to flow into surrounding regions of the component during brazing, a braze barrier may also be provided around the applied braze.

The heat treatment for carrying out the brazing process may be carried out in the temperature range from 1150° C. to 1200° C., in particular from 1170° C. to 1180° C. for 10 to 25 minutes, in particular 15 to 20 minutes.

A drying process may take place upstream of the heat treatment, in which drying process the applied braze with the hard material particles is air-dried at 50° C. to 80° C., preferably 60° C. to 70° C.

The heating process for heating to the brazing temperature may on the other hand, like the heat treatment at the brazing temperature, also take place under vacuum conditions, wherein the pressure may be in the range from $\leq 10^{-3}$ mbar, preferably $\leq 10^{-4}$ mbar.

The heating process to the brazing temperature may be carried out continuously at a constant or varying heating rate, wherein the heating rate may be selected to be in the range from 5° C. per minute to 30° C. per minute and in particular in the range from 10° C. per minute to 20° C. per minute.

Alternatively or in addition, the component with the applied repair material may also be held (stored) during the heating process at one or more intermediate temperatures for a given time, in order to give the repair material sufficient time for example for degassing of the bonding agent. For instance, intermediate storage may take place in the temperature range from 400° C. to 1100° C., for example at 450° C., 600° C. and/or 1050° C. for a duration of 5 to 40 minutes, in particular 10 to 30 minutes.

The hard alloys for the hard material particles may be alloys based on cobalt or nickel and in particular Co—Mo—Cr—Si alloys. Such alloys comprise the stated chemical elements with contents decreasing in the order in which they are listed, wherein additional alloy constituents may be present in smaller quantities and individual elements may also be omitted.

BRIEF DESCRIPTION OF THE DRAWINGS

In the appended drawings, which are purely schematic.

WORKING EXAMPLES

Further advantages, characteristics and features of the present invention are revealed by the following more detailed description of exemplary embodiments. The invention is, however, not limited to these exemplary embodiments.

Figure 1:
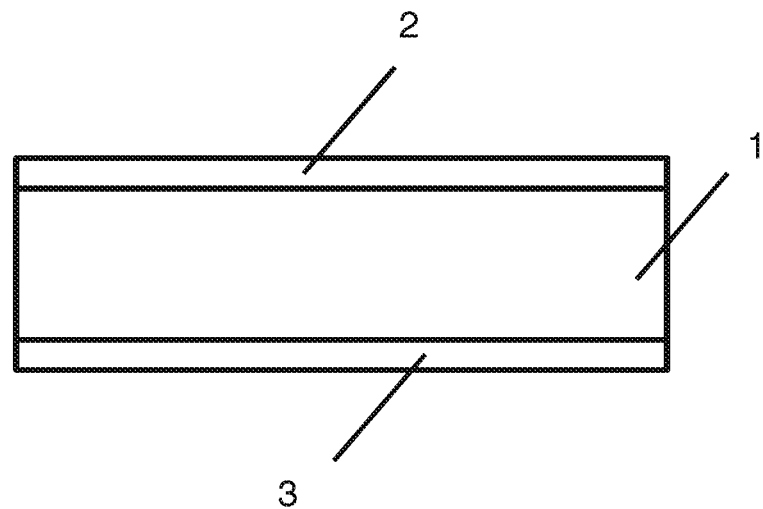
FIG. 1 shows a plan view onto a boundary element of a flow channel in a turbomachine.

FIG. 1 shows a plan view of a boundary element 1 of a flow channel, such as for example a component from the Turbine Center Frame (TCF), which, within the TCF, forms part of the gas duct connection between high pressure turbine and low pressure turbine. A plurality of boundary elements 1 may here be arranged adjacent one another, wherein the edges 2 and 3 each overlap with the adjacent boundary elements 1 and suffer wear due to mutual movement. The boundary elements have accordingly to be replaced or repaired if the wear at the edges 2, 3 causes excessive deviation from the specified component geometry.

Figures 2, 3, 4, 5:
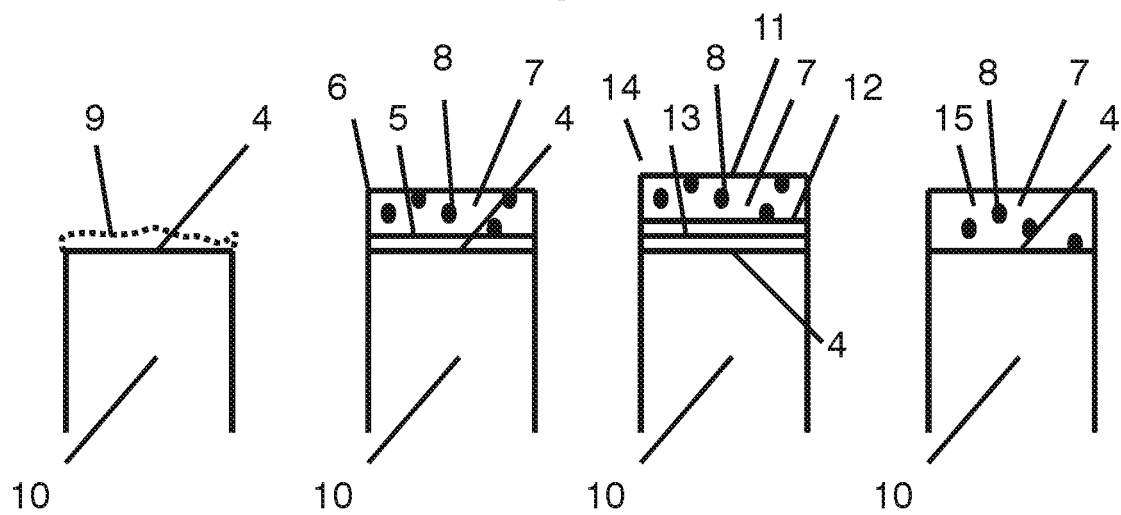
FIG. 2 shows a partial cross section through a component after preparation of the surface to be repaired.
FIG. 3 is a partially sectional view of a component after application of a braze tape according to the present invention.
FIG. 4 is a partially sectional view of a component after application of braze tape according to the present invention according to a second embodiment.
FIG. 5 is a partially sectional view of the component from FIG. 4 after completion of the repair layer.

FIG. 2 is a schematic view, in partial section through a component 10, of the situation prior to repair of the component 10 and after a first processing step according to one embodiment of the method according to the invention for repairing the component 10.

The dotted line in FIG. 2 shows the worn surface 9, which has an uneven topography due to the wear of the material. In order to have a defined surface for repair purposes, in a first processing step a part of the component 10 has been removed which was located between the worn surface 9 and a smooth, even surface 4 on which the repair layer according to the invention will be applied. The material removal between the worn surface 9 and the surface 4 on which the repair layer will be deposited may be achieved by various material-removing methods, for example by machining, in particular by grinding.

FIG. 3 shows how, in a further processing step, a braze tape 6 is applied to the surface 4 of the component 1. The braze tape 6 is arranged over a layer comprising a braze paste 5 on the surface 4 of the component 10. The braze tape 6 is formed of a nickel-based braze material 7 of Ni-alloy powder with bonding agent and with incorporated hard material particles 8, for example of a cobalt-chromium alloy. The ratio between nickel-based braze material and hard material particles may be 60% to 40% based on weight.

According to another embodiment, which is shown in FIG. 4, a braze tape 14 may be arranged over a bonding agent 13 on the surface 4 of the component 10 to be repaired. The braze tape 14 differs from the braze tape 6 of the previous embodiment in that it is of two-layer construction with an outer layer 11, which again constitutes a mixture of a nickel-based braze material 7 and incorporated hard material particles 8, while the inner layer 12 merely comprises a nickel-based braze material.

In both the embodiment according to FIG. 3 and the embodiment according to FIG. 4, the corresponding components 10 are subjected to a heat treatment after application of the nickel-based braze material and of the at least partially incorporated hard material particles, in order to carry out the brazing process. Prior to the heat treatment, first of all a drying step may be carried out, in which the components 10 are dried at a temperature of 60° C. for one hour in an air atmosphere.

After drying, the components 10 may be heated in a vacuum furnace, in which a vacuum of at least $1*10^{-3}$ mbar, preferably less than or equal to $1*10^{-4}$ mbar may be established, to a temperature of 1180° C., wherein the heating rate may be between 5° C. and 20° C. per minute. The heating rate should be selected to be so low that a vacuum of $\leq 10^{-3}$ mbar can be maintained.

Instead of continuous heating at a constant or variable heating rate, stepwise heating may also be performed, in which the components together with the applied braze are exposed to the temperature in specific temperature stages for a specific period, i.e. stored. For example, once the temperature of 450° C.+/−14° C. has been reached, storage at this temperature may proceed for 30 minutes. After further heating to 600° C.+/−14° C. at a heating rate of 20° C. per minute, this temperature may be maintained for 10 minutes. After further heating to 1050° C.+/−14° C., the corresponding component may again be held for 10 minutes at this temperature, while finally the final temperature of 1180° C.+/−5° C. may be held for 15 minutes, to conclude the brazing process. Cooling to room temperature from the brazing temperature of 1180° C. may then be achieved rapidly with the addition of an inert gas, for example by the addition of argon.

Once the heat treatment has been carried out, a repair layer 15 is located on the component 1, as shown schematically in FIG. 5. Hard material particles 8 are incorporated in the repair layer 15 in a matrix consisting of a nickel-based braze material 7 and contribute to increased wear resistance of the repair layer. The repair layer is selected in such a way, with regard to its dimensions, that the repaired component 10 then once again corresponds to the specified component geometries, in particular after final machining, for example by grinding. To take account of shrinkage of the repair material, i.e. of the nickel-based braze material and the hard material particles incorporated therein, during the heat treatment, the applied material for example in the form of a braze tape 6 or 14 may be dimensioned correspondingly larger.

To improve wetting by the braze, the surface 4 of the component 1 may be blasted with silicon carbide particles or with nickel powder prior to application of the nickel-based braze material or nickel electroplating may be performed.

The hard material particles may comprise hard alloys, such as cobalt-chromium alloys, Co—Cr—Mo—Si or Co—Mo—Cr—Si alloys. In particular, different hard material particles may be mixed together, such that not just one type of hard material particles may be present in the repair layer.

Although the present invention has been described in detail on the basis of the exemplary embodiments, it is self-evident to a person skilled in the art that the invention is not limited to these exemplary embodiments, but rather that variations are possible in that individual features may be omitted or other combinations of features realized, provided that these variations do not go beyond the scope of protection of the appended claims. In particular, the disclosure of the present invention encompasses all combinations of the individual features presented.

LIST OF REFERENCE NUMERALS

1 Boundary element
2 Edge
3 Edge
4 Surface
5 Braze paste
6 Braze tape
7 Nickel-based braze material
8 Hard material particles
9 Worn surface
10 Component
11 Outer layer
12 Inner layer
13 Bonding agent
14 Braze tape
15 Repair layer

What is claimed is:

1. A method for repairing a wear-damaged component of a turbomachine, wherein the method comprises:
preparing an area to be repaired to provide a smooth and clean surface,
applying a Ni-based braze comprising hard material particles to the surface to form a repair layer, the hard material particles comprising a hard alloy based on cobalt or nickel,
heat treating the component with the Ni-based braze thereon under vacuum conditions to braze the repair layer onto the component.

2. The method of claim 1, wherein the wear-damaged component of a turbomachine comprises elements of a flow duct boundary.

3. The method of claim 1, wherein, when preparing the area to be repaired, material is removed from the area to be repaired.

4. The method of claim 3, wherein the material is removed by machining.

5. The method of claim 1, wherein, when preparing the area to be repaired, blasting with silicon carbide particles and/or nickel particles is performed and/or nickel electroplating is performed.

6. The method of claim 5, wherein blasting with silicon carbide particles and/or nickel particles is performed and/or nickel electroplating is performed following material removal.

7. The method of claim 1, wherein the Ni-based braze is applied in the form of a tape or a foil.

8. The method of claim 7, wherein the braze tape or the braze foil is flexible and/or of multilayer construction.

9. The method of claim 7, wherein a two-layer braze tape is used, an outer layer of which comprises hard material particles and an inner layer of which, for arrangement on the area to be repaired, does not comprise any hard material particles.

10. The method of claim 9, wherein the outer layer of the braze tape comprises from 50 to 30 wt. % of hard material particles.

11. The method of claim 9, wherein the outer layer of the braze tape comprises from 45 to 35 wt. % of hard material particles.

12. The method of claim 7, wherein the braze tape or the braze foil is applied by a bonding agent or a braze paste to the area to be repaired and/or is surrounded with a braze paste.

13. The method of claim 1, wherein air-drying at temperatures of from 60° C. to 70° C. takes place prior to the heat treatment.

14. The method of claim 1, wherein the heat treatment comprises storing at a temperature of from 1150° C. to 1200° C. for from 10 to 25 min.

15. The method of claim 1, wherein the heat treatment comprises storing at a temperature of from 1170° C. to 1180° C. for from 10 to 25 min.

16. The method of claim 1, wherein the heat treatment comprises storing at a temperature of from 1150° C. to 1200° C. for from 15 to 20 min.

17. The method of claim 1, wherein the heat treatment comprises heating under vacuum conditions at a heating rate of from 5° C./min to 30° C./min and/or intermediate storage at temperatures of from 400° C. to 1100° C. for a period of from 5 to 40 min.

18. The method of claim 1, wherein the hard alloy comprises a Co—Mo—Cr—Si alloy.

19. The method of claim 11, wherein the hard alloy comprises a Co—Mo—Cr—Si alloy.

20. A component of a turbomachine with a repair layer thereon, wherein the repair layer comprises a matrix of an Ni-based braze which has hard material particles comprising a hard alloy based on cobalt or nickel incorporated therein.

* * * * *